United States Patent [19]

Brandt et al.

[11] Patent Number: 5,393,536
[45] Date of Patent: Feb. 28, 1995

[54] COEXTRUSION APPARATUS

[75] Inventors: Jeffrey R. Brandt, Reynoldsburg; Edward F. Kowalik, Pataskala; Bobby D. Riley, Columbus, all of Ohio

[73] Assignee: Crane Plastics Company, Columbus, Ohio

[21] Appl. No.: 43,037

[22] Filed: Apr. 5, 1993

[51] Int. Cl.6 .................. B29C 47/28; B29C 47/90
[52] U.S. Cl. ................. 425/112; 156/244.12; 156/500; 264/25; 264/26; 264/172; 264/173; 264/209.4; 264/209.6; 264/209.7; 264/236; 425/114; 425/131.1; 425/174.8 R; 425/325; 425/378.1; 425/380; 425/462; 425/467
[58] Field of Search .................. 264/173, 25, 174, 26, 264/172, 166, 209.7, 236; 156/209.44, 209.6, 244.12, 179, 500; 428/35.8, 36.5, 294, 295; 425/114, 380, 112, 133.1, 131.1, 462, 113, 174.8 R, 467, 378.1, 97, 325

[56] References Cited

U.S. PATENT DOCUMENTS

| 3,069,727 | 12/1962 | Shramek | 18/55 |
|---|---|---|---|
| 3,088,166 | 5/1963 | Colombo | 264/172 |
| 3,250,041 | 5/1966 | Anger | 49/501 |
| 3,553,301 | 1/1971 | Reardon et al. | 264/46 |
| 3,857,914 | 12/1974 | Aishima et al. | 264/45.5 |
| 4,130,976 | 12/1978 | Kesseler et al. | 52/656 |
| 4,141,944 | 2/1979 | Anstadt et al. | 264/45.5 |
| 4,206,165 | 6/1980 | Dukess | 264/45.9 |
| 4,281,492 | 8/1981 | Schock et al. | 52/309.9 |
| 4,383,812 | 5/1983 | Calcagni | 425/133.1 |
| 4,462,778 | 7/1984 | Calcagni | 425/113 |
| 4,481,701 | 11/1984 | Hewitt | 29/416 |
| 4,492,063 | 1/1985 | Schock et al. | 52/309.7 |
| 4,516,356 | 5/1985 | Delman | 49/504 |
| 4,600,461 | 7/1986 | Guy | 156/244.12 |
| 4,685,873 | 8/1987 | Willard et al. | 156/244.12 |
| 4,690,862 | 9/1987 | Hoffmann | 428/318.6 |
| 4,740,405 | 4/1988 | Tanaka et al. | 428/45 |
| 4,770,834 | 9/1988 | Nakasone et al. | 264/236 |
| 4,859,380 | 8/1989 | Ogata | 264/25 |
| 4,882,101 | 11/1989 | Ohkita et al. | 264/26 |
| 4,911,628 | 3/1990 | Heilmayr et al. | 425/131.1 |
| 4,983,453 | 1/1991 | Beall | 428/294 |
| 5,022,205 | 6/1991 | Ford | 52/309.16 |
| 5,049,331 | 9/1991 | Hempel | 264/103 |
| 5,089,189 | 2/1992 | Staneluis et al. | 264/45.3 |
| 5,096,645 | 3/1992 | Fink | 156/244.12 |
| 5,112,548 | 5/1992 | Roberts et al. | 264/171 |
| 5,120,380 | 6/1992 | Strachan | 425/114 |
| 5,124,186 | 6/1992 | Wycech | 428/35.8 |
| 5,238,633 | 8/1993 | Jameson | 425/114 |

FOREIGN PATENT DOCUMENTS

| 2843779 | 4/1980 | Germany | 264/209.4 |
|---|---|---|---|
| 202834 | 10/1983 | Germany | 264/173 |
| 51-38339 | 10/1976 | Japan | 264/174 |
| 51-42146 | 11/1976 | Japan | 264/174 |
| 53-57286 | 5/1978 | Japan | 264/174 |
| 58-63414 | 4/1983 | Japan | 264/174 |

Primary Examiner—Jeffery Thurlow
Attorney, Agent, or Firm—Standley & Gilcrest

[57] ABSTRACT

The present invention includes a method of producing a reinforced extrusion product, the product of the method, and the apparatus for making a reinforced extrusion product. The method of producing an extruded composite of the present invention, comprises the general steps of: (a) extruding a longitudinally oriented composite precursor comprising: (1) at least one thermoplastic polymeric material and (2) a core mixture of at least one thermosetting resin and at least one filler material; whereby the thermoplastic polymeric material(s) is/are extruded so as to substantially enclose a space, and whereby the core mixture is disposed in the space; and (b) maintaining the composite precursor under conditions whereby the thermoplastic polymeric material(s) become(s) cooled and the thermosetting resin(s) become(s) cured so as to form the extruded composite of the present invention. The present invention also includes an extruded composite made in accordance with the method of the present invention. The present invention also includes a coextrusion apparatus comprising: (1) an extrusion die adapted to form a hollow profile extrudate; (2) at least one extruder head adapted to extrude a thermoplastic material through the extrusion die so as to form a hollow thermoplastic extrudate; and an insulated injector tube adapted to coextrude a thermosetting material with the thermoplastic material and into the hollow thermoplastic extrudate.

7 Claims, 3 Drawing Sheets

COEXTRUSION APPARATUS

TECHNICAL FIELD

The present invention relates to a method of producing a reinforced extrusion product, and the products of such a method. The present invention also includes an apparatus for making a reinforced extrusion product of the present invention.

BACKGROUND

In the building and construction trade there is an ongoing continuing search for inexpensive materials which can be used as substitutes for more expensive materials or materials otherwise in more limited supply. In a search for alternative materials, one must of course give consideration to whether a substitute material will provide the requisite performance characteristics. Such characteristics include strength, resilience, uniformity, workability, weatherability, density, creep, thermal insulation value and expansion coefficient.

Of course, any substitute material must be able to be produced in sufficient quantity to meet the demands of the applications to which it is to be applied. Thus, it is desirable to be able to produce a building material in such quantity.

It is also desirable to be able to produce a building material quickly and efficiently, to save energy and labor. Typical building materials, such as stone, wood or metal must be harvested, transported and finished before being used. Therefore it is an object of the present invention to produce building materials that can be ready made for particular applications, and which can be produced within a range of physical characteristics such as those mentioned above.

Another desirable characteristic in a building material is that the material be workable, or at least be easily made workable. That is, it is desirable that the material be amenable to cutting and/or drilling; and be capable of receiving nails, screws, or fittings therefor; and be suitable for adhesive bonding. Thus it is an object of the present invention to produce a material which may be worked in a manner customary to the building trade and required in a variety of potential applications. It is also preferred that building materials be resistant to degrading environmental effects, such as water, sunlight, temperature change, abrasion, pests such as termites, etc. Therefore, another object of the present invention is to allow the production of building materials which may be readily used in a wide variety of interior and exterior settings while being relatively unaffected by such environmental effects, without the need for protective treatments such as staining, impregnation with chemicals, etc.

It is also an object of the present invention to be able to produce building materials which have consistent and reproducible mechanical and physical characteristics as outlined above.

Another present day concern is for the environment. Much attention has been focused on the need to recycle waste materials economically. This has meant finding uses for waste stream materials which are both safe and require little processing to the waste material to place it a useable form. It is therefore an object of the present invention to provide a method which can be used to produce a useful product from relatively unadulterated waste materials; and which is safe for those making use of such a product. Also, there has been concern for the long term conservation of harvestable forests. Thus, an object of the present invention is to provide a building material that could be used in place of scarce resource materials, such as wood or structural metals.

For instance, in searching for wood substitutes, consideration usually must be given to whether the substitute material will provide those minimum characteristics which will allow it to perform in a given desired application. One area in which materials of the present application might be applied is as substitutes for the high grade wood used in door and window frames, furniture, and the like. Such high grade wood is in limited supply and currently limits the total production of door and window frames. It is relatively uniform in its characteristics, being generally free of knots, blemishes and other discontinuities in the wood grain, and is relatively both light and strong. Even high grade wood however does vary in its physical characteristics. Also, wood is subject to degrading environmental effects.

Accordingly, it is an object of one embodiment of the present invention to produce a substitute building material for high grade framing wood which conforms to its physical characteristic profile while being relatively inexpensive to produce. It is also possible through the present invention to produce such a substitute building material in quantities which are sufficient to fill the need for such a material.

As to the production of a material which may vary in its physical characteristics, it is desirable to be able to produce a material which might have its physical characteristics adjusted depending, for instance, which particular grade of wood or strength of wood is to be replaced by the substitute material. It is also a goal of the present invention to produce a wood substitute material which is relatively unaffected by degrading environmental factors.

With regard to the production of composite materials in general, one obstacle to be overcome is to have the component materials bond to one another. Another related concern is to provide bonding which will allow thermal expansion and contraction without causing separation of the bound materials.

The process of producing composite materials is even further complicated when it is to be carried out in a continuous process, such as in an extrusion process. In such processes, it is important that the component materials be able to go through the "mating" process wherein the heating, cooling, cross-linking and dimensional stabilization of the component materials are coordinated and calibrated. For instance, in continuous extrusion processes, it is necessary that the cooling thermoplastic component be retained in the desired finished profile in the calibration zone until it has formed a durable "skin" that will resist damage in downstream processing steps. Additionally, the thermosetting core must cure sufficiently and have sufficient hot strength during this same retention period that it will not alter the profile defined by the thermoplastic component after leaving the calibration zone. It is therefore important that the uncured/uncooled composite have sufficient hot strength to retain the desired shape in the finished product. Accordingly, it is necessary to be able to provide such calibration and coordination if such component materials are to be made in a continuous process as described more fully herein.

Finally, it is always desirable to develop manufacturing processes which are able to use their own waste material by recycling. This is one of the features provided in the present invention.

Although the advantages and goals of the present invention are described with reference to building materials, particularly as a substitute for wood, the present invention is not limited to either general or specific uses. Indeed, the potential uses of the present invention are numerous as may become apparent to one of ordinary skill in the fields of endeavor to which the present invention might be applied.

Accordingly, additional advantages or the solution to other problems may become apparent to one of ordinary skill in these arts from the present disclosure or through practice of the present invention.

SUMMARY OF THE INVENTION

The present invention has several aspects which include a method of producing an extruded composite and an extruded composite which may be produced by such method. The present invention also includes a formulation for a core material used in the method of the invention.

The method of producing an extruded composite of the present invention, comprises the general steps of: (a) extruding a longitudinally oriented composite precursor comprising: (1) at least one thermoplastic polymeric material and (2) a core mixture of at least one thermosetting resin and at least one filler material; whereby the thermoplastic polymeric material(s) is/are extruded so as to substantially enclose a space, and whereby the core mixture is disposed in the space; and (b) maintaining the composite precursor under conditions whereby the thermoplastic polymeric material(s) become(s) cooled and the thermosetting resin(s) become(s) cured so as to form the extruded composite of the present invention.

As used herein, it shall be understood that the thermoplastic polymeric material(s) may be extruded so as to "substantially enclose a space", meaning that the present invention is not limited to the use of a thermoplastic/polymeric material which completely encloses a space. Rather, the present invention is also directed to possible embodiments which would allow a thermoplastic/polymeric material to contain the core mixture, although the core mixture may expose to the outside of the thermoplastic/polymeric material, such as where the thermoplastic/polymeric material has holes, slits, or is in the form of a U-shape.

It will normally be preferred that the thermoplastic polymeric material(s) completely enclose the space to be occupied by the core mixture. It is also generally preferred that the core mixture is coextruded with the thermoplastic polymeric material(s) at a rate whereby the core mixture substantially fills the space created by the thermoplastic polymeric material(s). For purposes of strength and dimensional stability, it is also preferred that the core mixture be selected so as to bind, chemically or mechanically, such as through adhesion, to the thermoplastic material(s).

The composite of the present invention may be formed into any cross-sectional shape in accordance with known practice with respect to the use of extrusion dies. Any die cross-section may be selected such that the cross-section of the longitudinally oriented composite precursor is appropriately shaped for the desired application or appearance. Such cross-sectional shapes may include a shape selected from the group consisting polygons, squares, rectangles, triangles, quadrilaterals, circles, and ovals. Irregular shapes may also be formed as the desired application dictates. The possible shapes are as variable as those which may be obtained from extrusion dies used in accordance with the present invention.

The thermoplastic polymeric material(s) used in accordance with the present invention may be selected from any thermoplastic material amenable for use in an extrusion in accordance with the practice of the method of the present invention, or mixtures of such materials. Such materials may include, for instance, polyvinylchlorides (PVC), chloropolyvinylchlorides, ABS polymers, polystirens, polycarbonates, thermoplastic rubbers, thermoplastic elastomers, flexible PVC's and fluoropolymers, and mixtures thereof. An example of suitable PVC material is medium impact, weatherable, rigid PVC, such as Formulation No. 7084-138, commercially available in cube form from B.F. Goodrich Chemicals of Akron, Ohio.

In applications where it is desirable to provide an additional layer of a thermoplastic material, this may be done by the coextrusion of additional layer of a thermoplastic material, such as through the use of an additional extruder head.

The thermosetting resin(s) used in accordance with the present invention may be selected from any resin material amenable for use in an extrusion in accordance with the practice of the method of the present invention, or mixtures of such materials. Such materials may include, for instance, thermosetting urethane resins, epoxide resins, isocyanate resins, phenolic resins and polyester resins, preferably a neopentyl glycol polyester resin such as Formulation No. E-120, commercially available from Owens-Corning Fiberglas Company of Toledo, Ohio. Typical of urethane resins are those commercially available from Miles Company of Pittsburgh, Pa. It is preferred that the resin(s) be selected so as to bind with the chosen thermoplastic polymeric material(s). For instance, where the chosen thermoplastic polymeric material is polyvinylchloride (e.g. B.F. Goodrich Formulation No. 7084-138), the resin may be a neopentyl glycol-styrene base polyester resin such as Formulation No. E-120, commercially available from Owens-Corning Fiberglas Company of Toledo, Ohio. Urethane resins also have particularly good bonding characteristics and may be foamed.

The thermosetting resin will normally be used with one or more catalysts, polymerization initiators and accelerators, or combinations thereof, in accordance with known practice in the art. For instance, the E-120 resin will be mixed with a polymerization initiator catalyst such as Cadet benzoyl peroxide 78. Initiators may be used for polyester resins and other vinyl cross-link type resins.

The filler material(s) used in accordance with the present invention may be selected from any filler material which will yield the desired combination of physical characteristics. Such physical characteristics include density, strength, coefficient of linear expansion, etc. Variations or substitutions in the filler materials may be made to vary the overall physical characteristics of the finished composite, depending upon the desired product.

For instance, the filler material(s) may be such materials as fly ash (amorphous silica/aluminum oxide/iron oxide glassy solid beads obtained from American Electric Power), reinforcing fibrous materials of any inorganic, organic or synthetic nature, such as chopped strand materials (e.g. glass reinforcing fibers), plant material such as ground corn cobs and sawdust, inorganic and mineral fillers (such as amorphous siliceous mineral silicate like Perlite commercially available from P.V.P. Industries), talc, mica, calcium carbonate, clays, aluminum trihydrate, aluminum oxide, and similar filler materials.

The filler material may also include longitudinally extending material(s). Such materials may be straight, wound or braided natural fibrous materials, such as hemp materials, and/or straight, wound or braided synthetic fibrous materials, such as aramid fibers, carbon fibers, graphite fibers, polyester fibers, nylon fibers, fiberglass and other commercially available fibers.

The filler material may also include such fibrous material(s) as mentioned above which have been shortened or chopped, such as Owens Corning 101C ¼" chopped strand glass fibers.

The filler material may also include a longitudinally extending metal cords, sheets, rods and wire material such as insulated wire which may be used for the transmission of electrical current and/or signals. Electrical wires can be used in a wide variety of applications where the incorporation of electrical current or signal transmission means in a building material is desirable.

Likewise, the filler material may also include a longitudinally extending fiber optic material which may be used for the transmission of light signals. This optional construction can be used in any of a variety of applications where the incorporation of electrical light signal transmission means in a building material is desirable.

Finally, the filler material may include waste material from the process itself. Such waste material may be ground extrudate which may be mixed with other filler.

The core mixture may also be made to contain a gas as a filler material in a desired amount in order to vary the physical characteristics. Gases can be provided to the core material for instance through the use of gas- or air-containing filler material, such as so-called "microsphere" materials, such as those sold under the 3M Scotchlite ® name and commercially available from 3M Corporation. An example is 3M K-20 microspheres. Such materials contain air or a pure gas as a known component of their total volume and can therefore be used to incorporate a known amount of a gas, such as air, into the core material. Another way of incorporating a gas into the core mixture is through the use of foaming agents which produce a gas (usually a gas such as nitrogen or carbon dioxide) during the extrusion process. The amount of such foaming agents can be controlled to determine the amount of gas per total volume to be incorporated into the finished composite product. Yet another way of incorporating a gas into the mixture is through the use of physical agitation, such as may be made in the mixing process to incorporate air into the resin. For instance, by use of the aforementioned techniques (or others) the core mixture may be provided with a gas present in an amount necessary to achieve the required core density thermal properties or other desired property. In the case of the production of a wood replacement product, the required density may be achieved by adjusting the volume of gas in the core material which will vary with the overall core material formulation.

It is also a feature of the present invention that waste materials of the method of the present invention can be recycled within the process by grinding waste such as extrudate cuttings so that they might be reused as a component of the core material filler. In this way the present invention can avoid the necessity of disposing of unused extrudate which may be spare ends from extrusion runs, blemished extrudate, etc.

It is normally the case that the thermosetting resin(s) used in accordance with the present invention cure(s) through an exothermic reaction. The curing reaction may be initiated by a heat activated catalyst and/or the heat present in the thermoplastic material(s) during extrusion which arises from the heat of the thermoplastic material(s) and the friction attendant to the extrusion. Thus, because the curing reaction adds heat to the newly extruded material, it is in such cases necessary to cool the extrudate at a rate generally greater than is normally undertaken in standard thermoplastic extrusion process. Appropriate cooling rates are those whereby the composite precursor is cooled at a rate sufficient to maintain the temperature of the extrudate in the calibration zone within a range such that the extrudate will maintain its desired shape. For instance, cooling may take place through the use of a cooling bath which provides cooling to the calibration zone over sufficient distance to bring the extrudate to within such range. This may require cooling over a substantial distance depending on the speed, temperature, heat capacity and insulative value of a given thermoplastic/thermosetting resin/filler combination. Cooling in accordance with the present invention can therefore be carried out using known and well characterized methods used in the extrusion art for extrudate cooling.

In some instances, it may be necessary to provide the thermosetting resin with additional heat to stimulate reaction. This may be done by supplementing the heat of the extrusion process with additional heating, such as through radio frequency or induction heating, radiant heating, or the like. Cooling rates may have to be adjusted accordingly to remove the increased amounts of heat in the newly formed extrudate.

The present invention also includes an extruded composite made in accordance with the method of the present invention.

The present invention also includes generally an extruded composite comprising: (a) a longitudinally oriented outer layer substantially enclose a space and comprising at least one thermoplastic polymeric material; and (b) a cured core mixture of at least one thermosetting resin and at least one filler material disposed in said space.

It is preferred that the extruded composite be formed from thermoplastic material(s) of the outer layer completely encloses the space. It is also preferred that the cured core mixture substantially fills said space. To do this, it is preferred that the core mixture is coextruded with said at least one polyvinylchloride material at a rate whereby said core mixture substantially fills the space.

The extruded composite may be formed into any cross-sectional shape such as shape selected from the group consisting polygons, squares, rectangles, triangles, quadrilaterals, circles, and ovals.

For the purpose of providing a wood substitute, the extruded composite preferably should have density in the range of from about 0.1 to about 0.8 grams per cubic centimeter, and a coefficient of linear expansion in the range of from about 0.2 to about $0.4 \times 10^{-5}/°F.$ centimeters per degree centigrade (parallel to fiber), and from about 2.0 to about $3.0 \times 10^{-5}/°F.$ centimeters per degree centigrade (across fiber).

The thermoplastic material(s), thermosetting resin(s) and filler material(s) may be selected from any of those described hereinabove.

The present invention also includes an extrudable polymeric precursor material which may be used as the core material as described above. The extrudable polymeric precursor material generally comprises a mixture of at least one thermosetting resin and at least one filler material. The thermosetting resin(s) used in accordance with the present invention may be selected from any resin material amenable for use in an extrusion in accordance with the practice of the method of the present invention, or mixtures of such materials. Such materials may include, for instance, polyesters, polyurethanes, phenolics, epoxides, vinyl esters, furanes, allyls, etc.

The filler material(s) used in accordance with the present invention may be selected from any filler material which will yield the desired combination of both physical characteristics in the cured mixture, and processing requirements. Such physical characteristics include density, strength, coefficient of linear expansion, etc. Variations or substitutions in the filler materials may be made to vary the overall physical characteristics of the finished composite, depending upon the desired product. For instance, the filler material(s) may be such inert materials as fly ash, chopped strand materials (such as glass reinforcing fibers), plant material, sawdust, or similar inert materials. The filler material may also include longitudinally extending fiber material(s). Such fiber materials may be wound or braided fiber material. Examples of such materials include glass fibers, aramid fibers, carbon fibers, polyester fibers and polyethylene fibers.

The filler material may also include a wire material, such as insulated wire, which may be used for the transmission of electrical current and/or signals. Electrical wires can be used in a wide variety of applications where the incorporation of electrical current or signal transmission means in a building material is desirable.

Likewise, the filler material may also include a longitudinally extending fiber optic material which may be used for the transmission of light signals. This optional construction can be used in any of a variety of applications where the incorporation of electrical light signal transmission means in a building material is desirable.

The core mixture may also be made to contain a gas in a desired amount in order to vary the physical characteristics, such as density. A gas can be provided to the core material for instance through the use of a gas-containing filler material, such as so-called "microsphere" polymeric materials, such as those sold under the "Scotchlite" ® name and commercially available from 3M Corporation. Such materials contain a gas (typically air) as a known component of their total volume and can therefore be used to incorporate a known amount of air into the core material. Another way of incorporating a gas into the core mixture is through the use of foaming agents which produce a gas during the extrusion process. Foaming agents which may be used in accordance with the present invention may also include so-called "physical" blowing agents such as freon, nitrogen, carbon dioxide, hydrocarbons and alcohols. The amount of such foaming agents can be controlled to determine the amount of a gas per total volume to be incorporated into the finished composite product. Yet another way of incorporating a gas (typically air) into the mixture is through the use of physical agitation, such as may be made in the mixing process.

As an alternative embodiment, it is also possible in accordance with the present invention to produce an extruded thermosetting resin mixture alone without the thermoplastic coextrudate. To do this, a mixture of components described with respect to the core mixture above may be extruded without a thermoplastic outer layer.

The present invention also includes a coextrusion apparatus comprising: (1) an extrusion die adapted to form a hollow profile extrudate; (2) at least one extruder head adapted to extrude a thermoplastic material through the extrusion die so as to form a hollow thermoplastic extrudate; and an insulated injector tube adapted to coextrude a thermosetting material with the thermoplastic material and into the hollow thermoplastic extrudate. The coextrusion apparatus may also include means to conduct a solid material into said hollow thermoplastic extrudate, said solid material selected from the group consisting of natural fibrous materials, synthetic fibrous materials, fiber optic materials and metal cords, wires, rods and sheets. The coextrusion apparatus may optionally include means to braid or wind the solid material.

DETAILED DESCRIPTION OF THE PREFERRED EMBODIMENT

In accordance with the foregoing summary of the invention, the following presents a detailed description of the one embodiment of the invention which is also presently considered to be the best mode of the invention for the purposes of preparing a wood substitute material for use in window frame construction.

Figure 1:
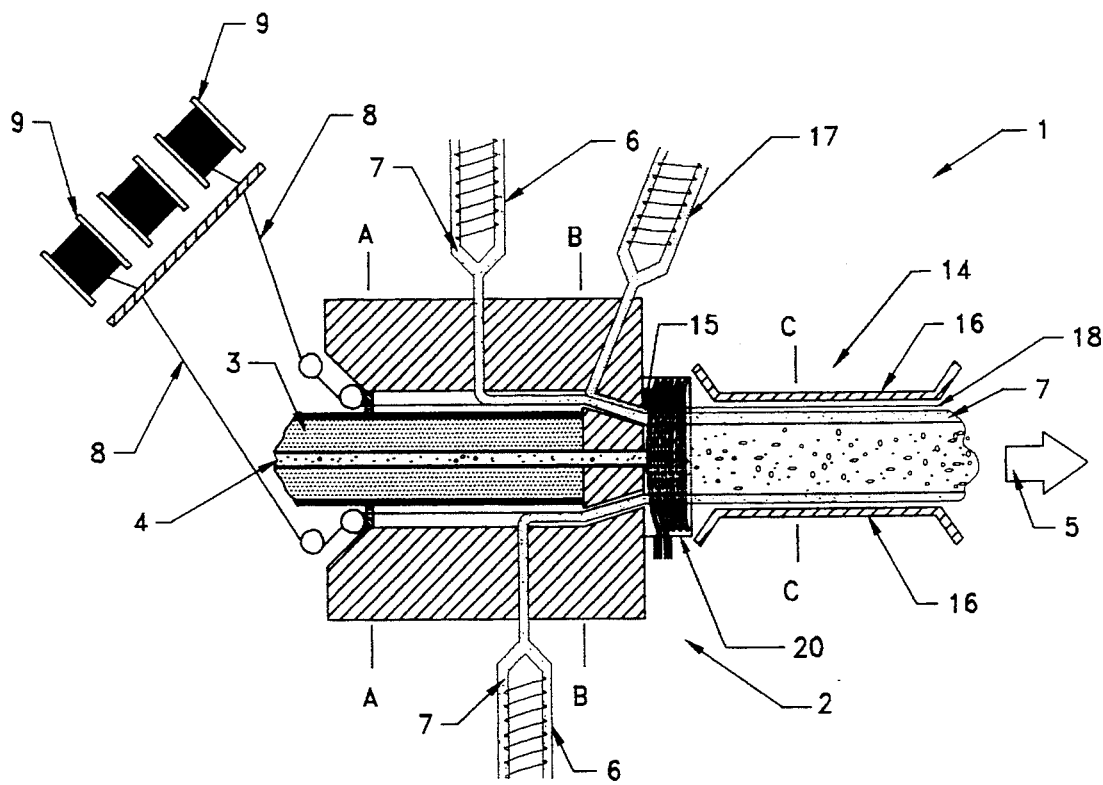
FIG. 1 is a sectioned elevational view of an apparatus in accordance with one embodiment of the present invention.

Turning to FIG. 1, this Figure shows a sectioned schematic of an extruder line used in accordance with the practice of one embodiment of the present invention.

FIG. 1 shows extruder line 1 which includes coextrusion apparatus 2. Coextrusion apparatus includes insulated injection tube 3 which is adapted to carry core material 4 which is pumped from batch mixer (pump and mixer not shown) along longitudinal direction 5. Coextrusion apparatus 2 also includes twin cross head extruders 6 which are adapted to prepare the thermoplastic material 7 for extrusion through a die which forms a hollow rectangular profile and urges it also along longitudinal direction 5.

The coextrusion apparatus 2 may also be adapted to coextrude reinforcement fibers 8 from spools 9 as shown in FIG. 1.

Another optional component of the present invention is that further layers of thermoplastic material, such as layer 18, can be added through the use of additional extruders such as extruder 17. Such additional layers of thermoplastic material may include layers of materials with specific characteristics for exterior use, such as fluoropolymers and PVC having greater or lesser impact rating as dictated by the desired end use.

Still another optional component which may be used in accordance the present invention is an additional heating means which may be used to supply additional activation heat to the core material beyond that attendant to the extrusion process itself. Examples of such supplementary heating means may include radio frequency or induction heating means, shown in FIG. 1 as heating unit 20.

Figure 2:
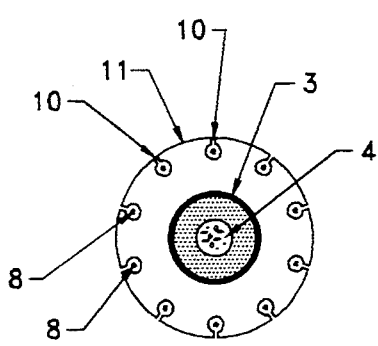
FIG. 2 is a cross-section view taken along line A—A of FIG. 1.

FIG. 2 shows a cross-section of coextrusion apparatus 2 along line A—A. FIG. 2 shows insulated injection tube 3 which, at this point has a relatively large thickness so as to carry the core material 4 while insulating it from the heat of the balance of the coextrusion apparatus to prevent inadvertent initiation of the curing reaction. FIG. 2 also shows fiber guides 10 in guide member 11 which serve to guide reinforcement fibers 8 through the coextrusion apparatus and orient them along the outside of insulated injection tube 3 as it carries core material 4.

Downstream of cross-section line A—A, the thermoplastic material 7 is added on either side by twin cross head extruders 6 so as to ultimately enclose the core material 4.

Figure 3:
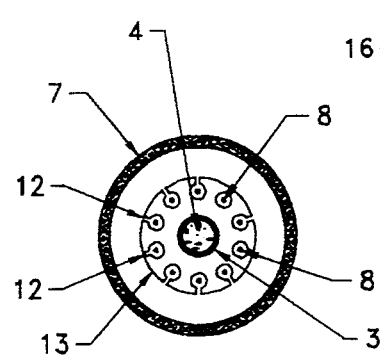
FIG. 3 is a cross-section view taken along line B—B of FIG. 1.

Further downstream at cross-section line B—B, the width of insulated injection tube 3 is reduced, as can be appreciated from FIG. 3. As can also be seen from FIG. 3, the fiber guides 12 in guide member 13 continue to guide reinforcement fibers 8 through the coextrusion apparatus and orient them along the outside of the insulated injection tube 3 as it carries core material 4. At this point, it can be appreciated that both the width of the core material 4 and that of the circular pattern of the reinforcement fibers 8 has been reduced.

FIG. 3 also shows how an outer layer of thermoplastic material 7 has been formed so as to completely surround guide member 13 and around insulated injection tube 3 which contains core material 4.

The core material 4 and thermoplastic material 7 are guided further downstream through a forming die 15 and into reaction/cooling zone 14. The thermoplastic material 7 is formed by the forming die (located at position 15) into the desired final shape, such as a rectangular cross-section. The core material is allowed to expand to fill the hollow space created in thermoplastic material 7. At this point, the core material, if extruded under pressure will begin to fill the space inside the thermoplastic extrudate. If provided with a foaming agent, the core material will begin to form void spaces, typically uniformly disbursed void spaces.

Figure 4:
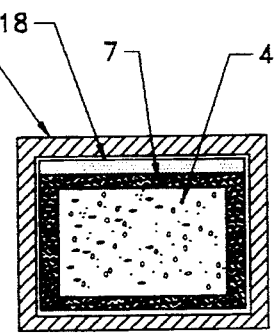
FIG. 4 is a cross-section view taken along line C—C of FIG. 1.

The composite formed is shown in cross-section in FIG. 4. FIG. 4 shows calibration guide 16 which holds the composite which comprises the thermoplastic material 7 filled by cured thermoset core material 4 which may contain filler material(s) as desired, and may include void spaces. The calibration guide may be in the form of down-line sizing tooling, such as a vacuum sizer, or wet or dry sizers. Such tooling should be sufficiently elongated or otherwise provide sizing control over the distance necessary to bring about cooling in the extrudate to insure dimensional stability. Such control will be required in those cases where the heat generated in the cure of the thermosetting resin, together with the heat of the thermoplastic material, would maintain the extrudate at a temperature which otherwise would cause the extrudate to lose form. Such tooling should be located immediately downstream of the point at which the reacting thermosetting resin and thermoplastic material are brought together.

Although shown as a closed rectangular cross-section, the thermoplastic material 7 may have any other cross-section which substantially encloses a space for the core material in accordance with the summary of the present invention.

Figure 5:
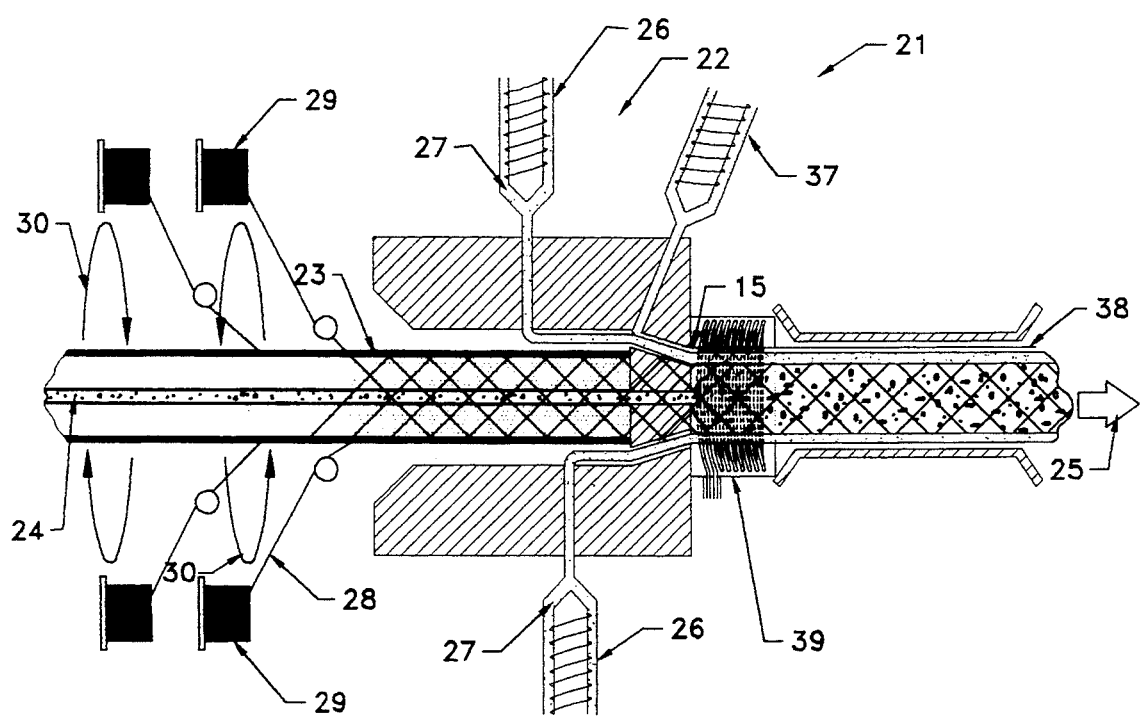
FIG. 5 shows a sectioned schematic of an extruder line used in accordance with the practice of another embodiment of the present invention.

FIG. 5 shows an alternative embodiment which is adapted to incorporate a continuously braided or woven fiber or wire material into the extrudate. Extrudates can thereby be given additional dimensional strength by providing reinforcement at an angle to the to the longitudinal axis of the extrudate.

FIG. 5 shows a sectioned schematic of an extruder line used in accordance with the practice of one embodiment of the present invention.

FIG. 5 also shows extruder line 21 which includes coextrusion apparatus 22. Coextrusion apparatus includes insulated injection tube 23 which is adapted to carry core material 24 which is pumped from batch mixer (not shown) along longitudinal direction 25. Coextrusion apparatus 22 also includes twin cross head extruders 26 which are adapted to prepare the thermoplastic material 27 for extrusion through a die which forms a hollow rectangular profile and urges it also along longitudinal direction 25.

The coextrusion apparatus 22 may also be adapted to coextrude reinforcement fibers 28 from spools 29 as shown in FIG. 5.

Spools 29 are rotated and counter-rotated (as shown by directional arrows 30).

Another optional component of the present invention is that further layers of thermoplastic material, such as layer 38, can be added through the use of additional extruders such as extruder 37. Such additional layers of thermoplastic material may include layers of materials with specific characteristics for exterior use, such as fluoropolymers and PVC having greater or lesser impact rating as dictated by the desired end use.

Still another optional component which may be used in accordance the present invention is an additional heating means which may be used to supply additional activation heat to the core material beyond that attendant to the extrusion process itself. Examples of such supplementary heating means may include radio frequency or induction heating means, shown in FIG. 5 as heating unit 39.

Another optional method of the present invention is to extrude the thermosetting resin/filler mixture (referred to above as the "core material" alone without layering the extrudate with a thermoplastic layer. Such material may be made using the apparatus of FIGS. 1 through 6 herein by eliminating the thermoplastic material altogether, and conducting the thermosetting resin/filler extrudate through a calibration zone.

The following represent three core material formulations, exclusive of optional longitudinal fibers or wires, or optional foaming agent.

| Formulation 1 | |
| --- | --- |
| Component | Amount (percent by weight)* |
| Neopentyl Glycol-Styrene Base Resin (Owens-Corning E-120) | 40% |

-continued

Formulation 1

| Component | Amount (percent by weight)* |
|---|---|
| Amorphous Silica/Alumina Oxide/ Iron Oxide (Glassy Solid Bead Fly Ash-American Electric Power) | 52% |
| Glass Microspheres (3M Scotchlite glass bubbles) | 8% |

*To this total is added Cadet benzoyl peroxide catalyst in an amount equivalent 2.5% by weight of the resin (alone).

Formulation 2

| Component | Amount (percent by weight)* |
|---|---|
| Neopentyl Glycol-Styrene Base Resin (Owens-Corning E-120) | 40% |
| Amorphous Silica/Alumina Oxide/ Iron Oxide (Glassy Solid Bead Fly Ash-American Electric Power) | 30% |
| Amorphous siliceous mineral silicate (P.V.P Industries Perlite) | 30% |

*To this total is added Cadet Benzoyl Peroxide 78 catalyst in an amount equivalent 2.5% by weight of the resin (alone).

Formulation 3

| Component | Amount (percent by weight)* |
|---|---|
| Neopentyl Glycol-Styrene Base Resin (Owens-Corning E-120) | 50% |
| Glass Microshperes (3M Scotchlite glass bubbles) | 30% |
| Glass Fibers (Owens Corning 101C ¼" chopped strand) | 20% |

*To this total is added Cadet Benzoyl Peroxide 78 catalyst in an amount equivalent 2.5% by weight of the resin (alone).

Additional formulations are detailed in Table 1. These formulations use a catalyst in accordance with the catalyst shown with respect to formulations 1-3 above.

Figure 6:
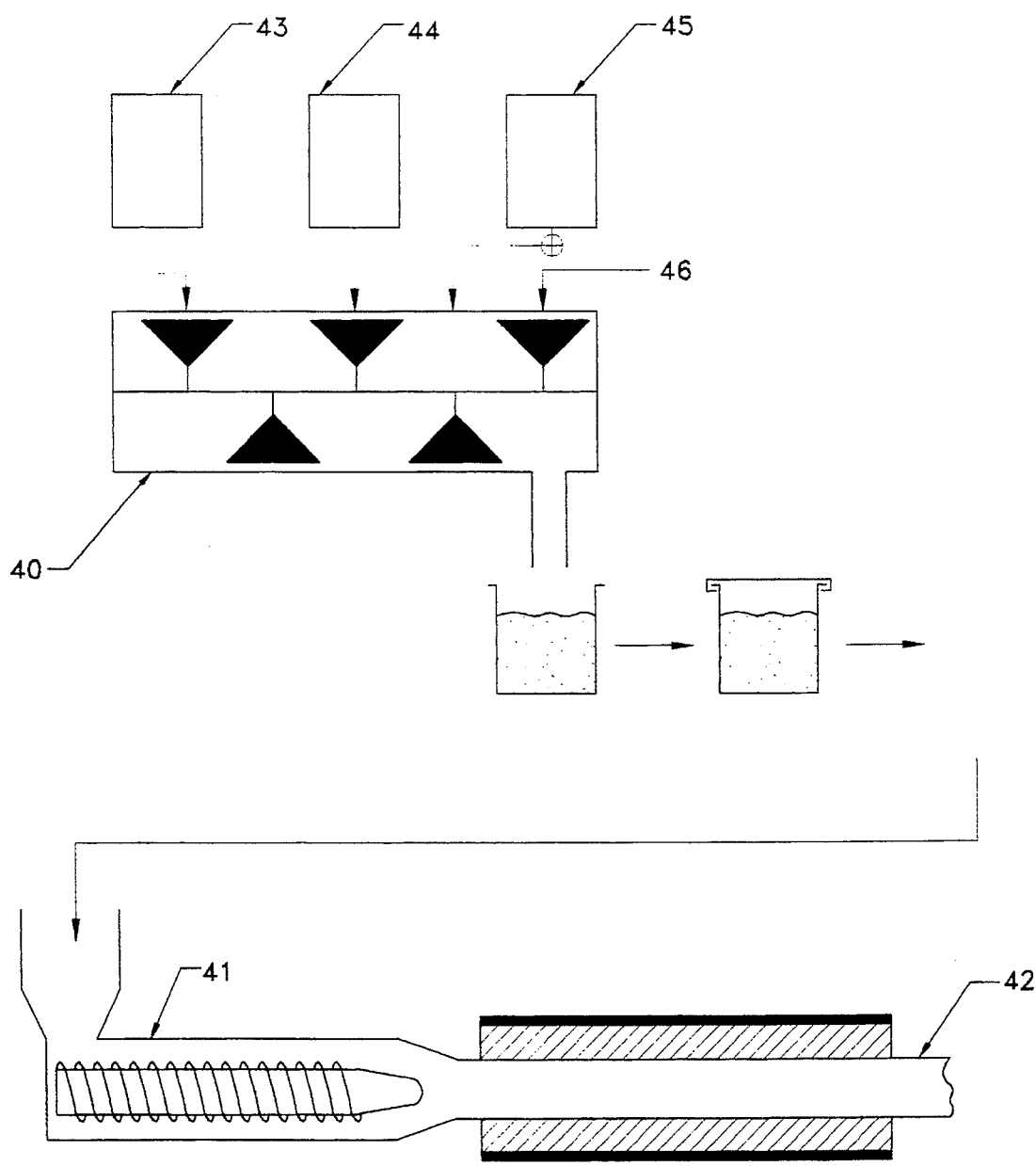
FIG. 6 shows a schematic of the mixing process for the core material.

FIG. 6 shows a schematic of the mixing process for the core material. Resin, filler material(s), catalyst and other processing aids (foaming agent, etc.), in containers 43, 44 and 45, are mixed in batch mixer 40, such as Model No. M5R, commercially available from Littleford Day Company. Minor ingredients 46 may also be added to the formulation mixture as shown. The mixture is checked for quality control purposes and then placed in core extruder 41 to be pumped through injection tube 42, as is shown in more detail in FIGS. 1 and 5 herein.

In view of the foregoing disclosure, it will be within the ability of one skilled in the art to make alterations and variations to the present invention, such as through the substitution of equivalent materials and processing steps, without departing from the spirit of the invention as reflected in the following claims.

TABLE 1

| COMPONENT | 1 | 2 | 3 | 4 | 5 | 6 | 7 | 8 | 9 | 10 | 11 | 12 | 13 |
|---|---|---|---|---|---|---|---|---|---|---|---|---|---|
| Resin | 18.00 | 20.00 | 20.00 | 15.00 | 25.00 | 35.00 | 34.00 | 20.00 | 30.00 | 45.00 | 25.00 | 72.00 | 72.00 |
| Calcium Carb | 78.00 | 25.00 | 80.00 | 85.00 | | | | 70.00 | | | | | |
| Fly ash | | 51.00 | | | 50.00 | 50.00 | 44.00 | | 58.00 | 47.00 | 75.00 | | |
| Saw Dust (course) | | | | | 25.00 | 15.00 | | | | | | | |
| Saw Dust (fine) | | | | | | | 22.00 | | | | | | |
| Mineral fibers | | | | | | | | 10.00 | | | | | |
| Wood fibers (MT) | | | | | | | | | 12.00 | 8.00 | | | |
| Glass bubbles | | | | | | | | | | | | 28.00 | |
| Perlite | | | | | | | | | | | | | 28.00 |
| Wood fiber (TF) | | | | | | | | | | | | | |
| Other | 4.00 | 4.00 | | | | | | | | | | | |
| Clay | | | | | | | | | | | | | |
| Sp.Gr. G/CC | 2.21 | 1.96 | 2.19 | 2.30 | 1.13 | 1.27 | 1.14 | 2.20 | 1.37 | 1.38 | 1.82 | .88 | .59 |
| COE ×10⁻⁵/°F. | .91 | .85 | .66 | .79 | — | — | — | .91 | 1.17 | — | — | — | — |

| COMPONENT | 14 | 15 | 16 | 17 | 18 | 19 | 20 | 21 | 22 | 23 | 24 | 25 | 26 |
|---|---|---|---|---|---|---|---|---|---|---|---|---|---|
| Resin | 40.00 | 40.00 | 40.0 | 48.5 | 44.00 | 38.00 | 30.00 | 45.00 | 40.0 | 41.0 | 35.00 | 44.44 | 40.00 |
| Calcium Carb | | | | | | | | | | | | | |
| Fly ash | 40.00 | 40.00 | 40.0 | 48.5 | 44.00 | 38.00 | 40.00 | | 51.0 | 50.00 | 22.22 | 40.00 | |
| Saw Dust (course) | | | | | | | | | | | | | |
| Saw Dust (fine) | | | | | | | | | | | | | |
| Mineral fibers | | | | | | | | | | | | 11.11 | 10.00 |
| Wood fibers (MT) | | | | | | | | | | | | | |
| Glass bubbles | 20.00 | | 20.0 | 3.00 | 12.00 | 5.00 | | 11.00 | | 8.00 | | 22.22 | 10.00 |
| Perlite | | 20.00 | | | | | | | | | 15.00 | | |
| Wood fiber (TF) | | | | | | 19.00 | 30.00 | 44.00 | 60.00 | | | | |
| Other | | | | | | | | | | | | | |
| Clay | | | | | | | | | | | | | |
| Sp.Gr. G/CC | .76 | .76 | .76 | .47 | .66 | .81 | 1.11 | .52 | .79 | .83 | .90 | .72 | 1.06 |
| COE ×10⁻⁵/°F. | — | — | — | — | — | — | — | 1.86 | 1.82 | 1.07 | — | 1.44 | — |

| COMPONENT | 27 | 28 | 29 | 30 | 31 | 32 | 33 | 34 | 35 | 36 | 37 | 38 |
|---|---|---|---|---|---|---|---|---|---|---|---|---|
| Resin | 40.00 | 42.00 | 40.00 | 40.00 | 37.50 | 35.00 | 40.00 | 50.00 | 50.00 | 40.00 | 40.00 | 40.00 |
| Calcium Carb | | | | | | | | | | | | |
| Fly ash | | | 25.00 | 25.00 | | 35.00 | 30.00 | | | 15.00 | 20.00 | 25.00 |
| Saw Dust (course) | | | | | | 25.00 | | | | | | |
| Saw Dust (fine) | | | | | | | | | | | | |
| Mineral fibers | | | | | 18.75 | | | 20.00 glass fibers | 20.00 glass fibers | 30.00 glass fibers | 20.00 | 10.00 |
| Wood fibers (MT) | | | | | | | | | | | | |

TABLE 1-continued

| FORMULATION | | | | | | | | | | | | |
|---|---|---|---|---|---|---|---|---|---|---|---|---|
| Glass bubbles | 8.00 | 8.00 | 10.00 | 10.00 | 6.25 | 5.00 | | | 30.00 | 15.00 | 20.00 | 25.00 |
| Perlite | | | | | | | 30.00 | 30.00 | | | | |
| Wood fiber (TF) | 52.00 | 33.00 | | 25.00 | | | | | | | | |
| Other | | | | | | | | | | | | |
| Clay | | 17.00 | 25.00 | | 37.5 | | | | | | | |
| Sp.Gr. G/CC | .18 | .80 | 1.13 | .81 | 1.45 | .77 | .60 | .59 | .50 | .79 | .67 | .58 |
| COE ×$10^{-5}$/°F. | — | — | — | — | — | — | — | — | — | — | — | — |

What is claimed is:

1. A coextrusion apparatus, said apparatus comprising:
   (a) an extrusion die adapted to form a hollow profile extrudate said extrusion die having an upstream side and a downstream side;
   (b) at least one extruder head disposed on said upstream side of said extrusion die adapted to extrude a thermoplastic material through said extrusion die so as to form a hollow thermoplastic extrudate; and
   (c) an insulated injector tube disposed on said upstream side of said extrusion die adapted to coextrude a thermosetting material with said thermoplastic material and into said hollow thermoplastic extrudate.

2. A coextrusion apparatus according to claim 1 wherein said apparatus further comprises means to conduct a solid material into said hollow thermoplastic extrudate, said solid material selected from the group consisting of natural fibrous materials, synthetic fibrous materials, fiber optic materials and metal cords, wires, rods and sheets.

3. A coextrusion apparatus according to claim 2 wherein said apparatus further comprises means to conduct a solid material into said hollow thermoplastic extrudate additionally comprises means to braid said solid material.

4. A coextrusion apparatus according to claim 2 wherein said apparatus further comprises means to conduct a solid material into said hollow thermoplastic extrudate additionally comprises means to wind said solid material.

5. A coextrusion apparatus according to claim 2 wherein said apparatus further comprises dimension control means to control the dimensions of said thermoplastic extrudate, said dimension control means disposed downstream of said insulated injector tube.

6. A coextrusion apparatus according to claim 2 wherein said apparatus further comprises heating means to heat said thermoplastic extrudate, said heating means disposed downstream of said insulated injector tube.

7. A coextrusion apparatus according to claim 6 wherein said heating means comprises a heating means selected from the group consisting of induction heating means and radio frequency heating means.

* * * * *

UNITED STATES PATENT AND TRADEMARK OFFICE
CERTIFICATE OF CORRECTION

PATENT NO. : 5,393,536
DATED : February 28, 1995
INVENTOR(S) : Jeffrey R. Brandt, et. al.

It is certified that error appears in the above-indentified patent and that said Letters Patent is hereby corrected as shown below:

Column 11, Table 1, tavle column 22, in the row marked "Fly ash", delete "51.0".

Table 1, table column 23, in the row marked "Fly ash", delete "50.00" and insert in its place --51.0--.

Table 1, table column 24, in the row marked "Fly ash", delete "22.22" and insert in its place-- 50.00--.

Table 1, table column 25, in the row marked "Fly ash", delete "40.00" and insert in its place -- 22.22

Table 1, table column 26, in the row marked "Fly ash", insert --40.00--.

Signed and Sealed this

First Day of August, 1995

Attest:

BRUCE LEHMAN

Attesting Officer

Commissioner of Patents and Trademarks